United States Patent [19]

Kaczynski

[11] Patent Number: 4,865,294
[45] Date of Patent: Sep. 12, 1989

[54] SUSPENDED CEILING CABLE SLIDE

[75] Inventor: Jeffrey L. Kaczynski, Southington, Conn.

[73] Assignee: Seatek Company Incorporated, Stamford, Conn.

[21] Appl. No.: 134,374

[22] Filed: Dec. 17, 1987

[51] Int. Cl.⁴ .......................................... B65H 59/00
[52] U.S. Cl. .......................................... 254/134.3 R
[58] Field of Search ............. 254/134.3 R, 134.3 FT, 254/409, 410, 411, 412, 389; 242/157 R; 174/135

[56] References Cited

U.S. PATENT DOCUMENTS

| | | | |
|---|---|---|---|
| 442,868 | 12/1890 | Du Bois | 254/134.3 R |
| 2,133,221 | 10/1938 | White | 242/157 R |
| 2,258,745 | 10/1941 | Dewey et al. | 254/134.3 R |
| 3,160,394 | 12/1964 | Hunter et al. | 254/134.3 R |
| 4,132,665 | 1/1979 | Nelson | 254/134.3 R |
| 4,228,940 | 10/1980 | Umehara | 242/157 R |

Primary Examiner—Robert C. Watson
Attorney, Agent, or Firm—DeLio & Associates

[57] ABSTRACT

A slide for directing electrical cable over suspended ceiling frames without chafing of the cable or top ridges of main runners of the ceiling frames.

9 Claims, 2 Drawing Sheets

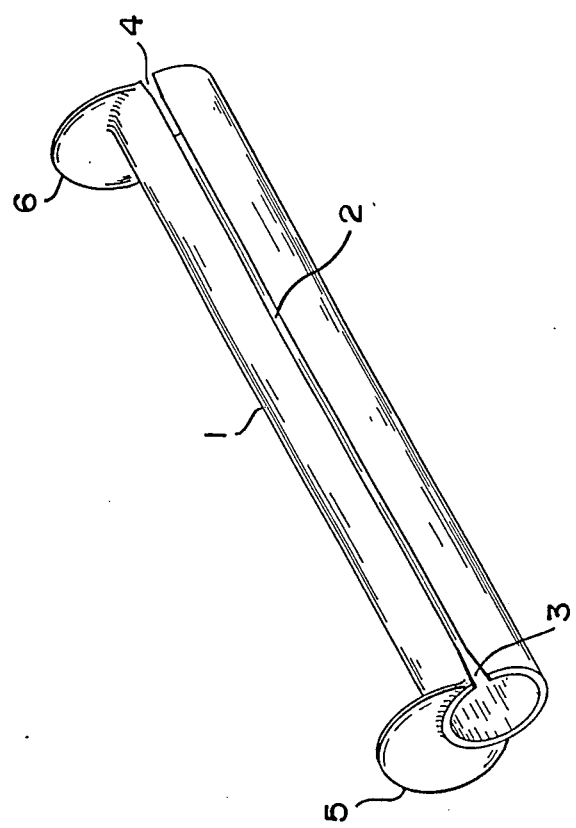

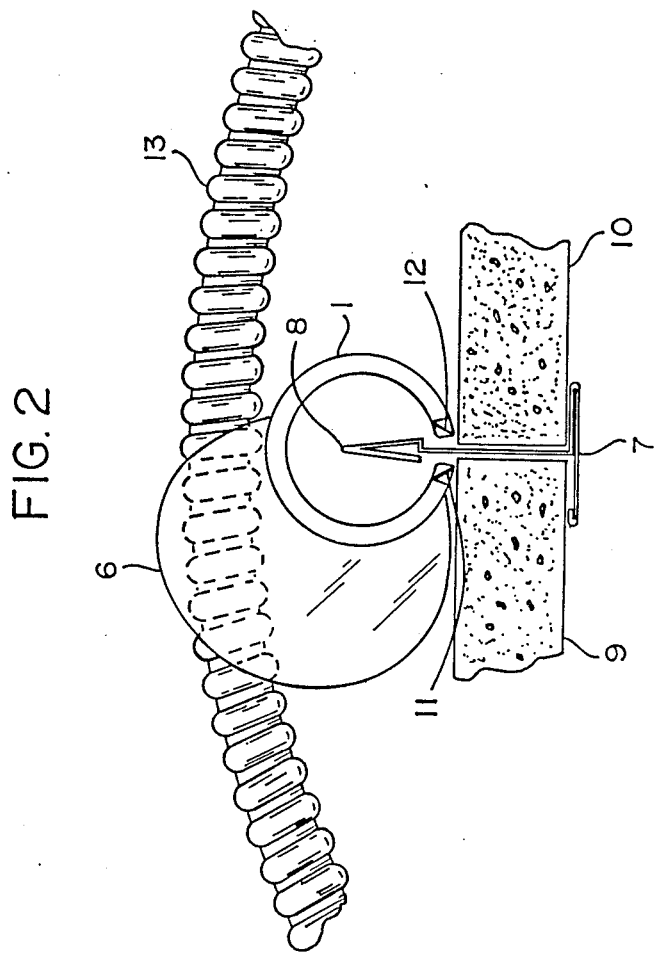

SUSPENDED CEILING CABLE SLIDE

BACKGROUND OF THE INVENTION

A task often encountered by electrical contractors is the guiding of electrical cable over suspended ceiling frames from one location in a building to another. Suspended ceilings are made of a metal grid of main runners and cross bars into which nonmetallic fibrous ceiling panels have been placed. It usually takes at least two persons to guide electrical cable from its dispensing point to its destination point. The specific problems encountered include guiding the cable in the right direction over the ceiling frame and chafing of the cable and/or top ridge of the main runners of the ceiling frame. In particular, BX cable, which is electrical cable with a ribbed metal sheath, has a considerable tendency to cut into the top ridge of the main runners when the BX cable is sliding directly on the top surface of the main runners.

OBJECT OF THE INVENTION

It is the object of this invention to solve the problems of guiding electrical cable over suspended ceiling frames and the resulting chafing of wire and main runners. The invention accomplishes these goals by providing a limited path for the electrical cable which prevents contact between the cable and the main runners of a suspended ceiling. As a result of this invention, only one person is needed to guide electrical cable from its dispensing point to its destination point.

DESCRIPTION OF THE INVENTION

One embodiment of the invention is shown in detail in FIGS. 1 and 2.

FIG. 1 shows a bottom view of the slide which is a plastic tube 1 possessing a slot 2 with wedge-shaped beveled ends 3 and 4, and two ears 5 and 6 with rounded edges located at the ends of the tube adjacent to the ends of the slots.

FIG. 2 shows a side view of the invention in operation. The slide 1 has been pushed onto the top ridge 8 of a main runner. The wedge shapes and beveled ends 11 and 12 of the slot make it easier to push the slide onto and off of the main runner top ridge. The slide rests on ceiling panels 9 and 10 which in turn are supported by the bottom flat section 7 of the main runner. If a cable is being dispensed through an opening in the ceiling by virtue of a missing panel, then the slide rests just on panel 10.

A BX cable 13 is shown being pulled over the top of the slide in a direction from left to right in FIG. 2. As the BX cable is pulled from left to right, it is kept within the width of the slide by the two ears (only one ear 6 is shown in FIG. 2), and the BX cable is also kept from contact with the top of the main runner.

The cable slide is made of a plastic material such as polyvinyl chloride.

Preferred dimensions of the cable slide are as follows. The slide is either 12 in. or 24 in. in length, with a 1 in. inner diameter, and a 1¼ in. outer diameter. The ears of the cable slide are ¼ in. thick and have a diameter of approximately 2½ inches. Finally, the slot of the cable slide has a ⅛ in. width.

What is claimed is:

1. A device for guiding electrical cable across a suspended ceiling comprising:
   a slide member for mounting on a suspended ceiling frame including:
   a cable support surface on an upper part of the slide member for supporting an electrical cable above the slide member and for protecting the suspended ceiling frame against chafing during installation of the electrical cable; and
   a mounting means on a lower part of the slide member for engaging and securely connecting the slide member to the suspended ceiling frame; and
   at least two guide ears mounted on the slide member at opposed ends of the cable support surface and extending above the level of the cable support surface, the guide ears acting to guide the electrical cable between the guide ears and retain the electrical cable upon the cable support surface as the cable is pulled across the suspended ceiling during installation.

2. A device as described in claim 1 wherein the slide member forms a hollow tube, the ears being mounted at each end of the tube.

3. A device as described in claim 2 wherein the mounting means comprises a slot longitudinally formed in the tube which engages a top ridge on the suspended ceiling frame, the ears being mounted at each end of the tube adjacent to the slot.

4. A device as described in claim 3 wherein the slot is wedge-shaped and beveled at each end whereby the slide member may be easily pushed onto the top ridge.

5. A device as described in claim 4 wherein the slide member is made of plastic.

6. A device as described in claim 5 wherein the slide member is made of polyvinyl chloride.

7. A device as described in claim 1 wherein the ears have rounded edges.

8. A device as described in claim 1 wherein the ears are arcuately shaped.

9. A device as described in claim 1 wherein the slide member is elongated and the ears are widely separated.

* * * * *